United States Patent [19]

Dixon et al.

[11] 4,142,021

[45] Feb. 27, 1979

[54] OXYGEN BARRIER LAMINATE FILMS INCLUDING A POLYALKYLENE CARBONATE ADHESIVE

[75] Inventors: Dale D. Dixon, Kutztown; Michael E. Ford, Trexlertown, both of Pa.

[73] Assignee: Air Products and Chemicals, Inc., Allentown, Pa.

[21] Appl. No.: 802,393

[22] Filed: Jun. 1, 1977

[51] Int. Cl.$^2$ .............................................. B32B 27/36
[52] U.S. Cl. ................................... 428/412; 428/461; 428/483; 428/508; 428/511; 156/306; 528/421
[58] Field of Search ............... 428/412, 461, 483, 511, 428/508; 260/77.5 D, 47 EP, 47 XA

[56] References Cited

U.S. PATENT DOCUMENTS

| | | | |
|---|---|---|---|
| 3,420,679 | 1/1969 | Gifford et al. | 428/412 X |
| 3,585,168 | 6/1971 | Inoue et al. | 260/77.5 D |
| 3,949,114 | 4/1976 | Viola et al. | 428/412 X |
| 3,959,432 | 5/1976 | Wiley | 428/412 X |

*Primary Examiner*—P. C. Ives
*Attorney, Agent, or Firm*—William F. Marsh; Barry Moyerman

[57] ABSTRACT

Laminate structures having excellent barrier properties to moisture and oxygen vapor transmission comprising a base layer and an adhesive barrier layer of a polyalkylene carbonate, typically of the type formed by reacting an epoxide with carbon dioxide, are shown.

12 Claims, No Drawings

OXYGEN BARRIER LAMINATE FILMS INCLUDING A POLYALKYLENE CARBONATE ADHESIVE

BACKGROUND OF THE INVENTION

1. Field

This invention relates to laminate structures particularly adapted for packaging a multitude of products.

2. Description of the Prior Art

U.S. Pat. No. 3,949,114 discloses polymeric laminates containing an oxygen barrier layer of a hydrolyzed olefin-vinyl ester copolymer, e.g. vinyl acetate-ethylene for packaging foodstuffs. Generally, a heat sealable layer and a substrate layer sandwich the olefin-vinyl ester polymeric film to form the laminate.

U.S. Pat. No. 3,923,757 discloses the use of terpolymers of ethylene-vinyl acetate-vinyl alcohol as an adhesive for binding an aromatic polycarbonate of the type formed by reacting Bis-Phenol A and phosgene gas.

U.S. Pat. No. 3,595,740 discloses an oxygen barrier film comprising an inner barrier layer of a melt extrudable hydrolyzed ethylene-vinyl acetate copolymer, an outer layer of a thermoplastic polymer and a heat sealing layer of an ethylene polymer or copolymer. These particular films are adapted for packaging food and are alleged to have significant advantages over packaging laminate films of regenerated cellulose coated with saran or biaxially oriented polyethylene terephthalate films coated with saran and thereafter either laminated or coated with ethylene polymers and copolymers.

U.S. Pat. No. 3,420,679 discloses a laminated film for food packaging which comprises a saran layer and polycarbonate layer. The polycarbonate layer is provided to give strength to the laminate and saran gives oxygen and moisture impermeability.

U.S. Pat No. 3,956,544 discloses a tubular mold having resistance to stretch and having resistance to oxygen and moisture vapor transmission having, as major plies, a polypropylene and cellophane ply coated on each side with saran and these coated plies bonded together with an adhesive. These laminate films were alleged to have excellent characteristics for the processing of cheese.

U.S. Pat. No. 3,917,894 discloses a film particularly adapted for the manufacture of sausage casings and having oxygen and moisture barrier properties. The film comprises a regenerated cellulose film coated with an epoxy-substituted poly-secondary amine resin bonded thereto. Optionally, a top coat is applied to the epoxy-substituted poly-secondary amine resin and such top coats include printing inks, vinyl chloride, alkyd resins, acrylic and methacrylic acid esters, and so forth.

Polyalkylene carbonates formed by reacting for example, ethylene and propylene oxide with carbon dioxide in the presence of a catalyst, have been developed in recent years. Typically, these polyalkylene carbonates have been used as molding compositions. Examples of the polycarbonates and methods for their manufacture are shown in U.S. Pat. Nos. 3,585,168; 3,699.079; 3,748,345; 3,900,424 and 3,953,383.

SUMMARY OF THE INVENTION

This invention relates to laminate structures having excellent resistance to moisture and oxygen vapor transmission and to laminate structures which are particularly adapted for the food packaging industry. Broadly, the laminate structure comprises a base layer and an adhesive barrier layer bonded to the base layer, the adhesive being a polyalkylene carbonate represented by the formula:

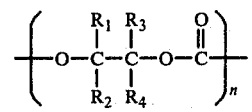

wherein:
$R_1$ is hydrogen, a halomethyl group or a hydrocarbyl group having from 1 to 6 carbon atoms;
$R_3$ is hydrogen, a halomethyl group, or a hydrocarbyl group having from 1 to 6 carbon atoms;
$R_2$ and $R_4$ are hydrogen, or hydrocarbyl groups having from 1 to 6 carbon atoms; or
$R_1$, $R_2$, $R_3$ and $R_4$ are combined together constituting a carbocyclic ring having from 4 to 7 carbon atoms; and
n is a number from about 250 to about 6,500.

In a preferred embodiment, the laminate has at least three layers with the base layer generally being a thermally formable, heat sealable polymer, the polyalkylene carbonate layer as the intermediate and adhesive layer, and a top layer which is a dimensionally stable polymer or paper.

Advantages of the laminate structure of this invention include:

a laminate structure which has excellent resistance to the transmission of oxygen and moisture vapor;

a laminate structure having excellent peel strength by virtue of the outstanding adhesion of the polyalkylene carbonate to the base layer and, in preferred situations, to the base layer and to the top layer or top coat;

a laminate structure which employs a non-toxic adhesive and barrier material;

a laminate structure which is tough and puncture resistant;

a laminate structure which has excellent resistance to oil permeation and therefore suited for packaging oil base products; and a laminate structure which can be readily manufactured to form a heat sealable package.

DESCRIPTION OF THE PREFERRED EMBODIMENTS

The polycarbonates which are employed as the adhesive barrier layer of the laminate structures of this invention are of the type which are normally solid at room temperature (70° F.) and atmospheric pressure, and are formed by polymerizing an epoxide with carbon dioxide to form a polymer having alternating units of epoxide and carbon dioxide. The molecular weight of the polycarbonates generally range from about 50,000 to about 500,000, and preferably the molecular weight range is from about 75,000 to 150,000.

Structurally, the polycarbonates are represented by the formula:

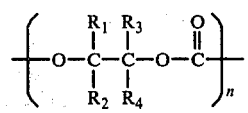

wherein:
$R_1$ is hydrogen, a halomethyl group or a hydrocarbyl group having from 1 to 6 carbon atoms;

$R_3$ is hydrogen, a halomethyl group, or a hydrocarbyl group having from 1 to 6 carbon atoms;

$R_2$ and $R_4$ are hydrogen, or hydrocarbyl groups having from 1 to 6 carbon atoms; or $R_1$, $R_2$, $R_3$ and $R_4$ are combined together constituting a carbocyclic ring having 4 to 7 carbon atoms; and n is a number from about 250 to about 6,500.

The epoxides suited for forming the polycarbonates generally are 1,2 epoxides and, as represented in the formula, can be substituted with the plurality of organo groups. These groups include, for example, hydrocarbyl groups, which by definition, include lower alkyl ($C_1$-$C_3$), cycloaliphatic, aryl groups and substituted groups, e.g. chlorine, hydroxyl, ester and aldehyde groups pendent from the epoxide. Typically, the groups pendent on the epoxide reactant are hydrogen, lower alkyl, e.g. methyl and ethyl; and phenyl groups. Examples of suitable epoxides for making the polycarbonate include ethylene oxide, propylene oxide, styrene oxide, isobutylene oxide, 2,3-butylene oxide, epichlorohydrin, butylene oxide, cyclohexane epoxide, methylcyclohexane epoxide, ethylene cyclohexane epoxide, and the like. Of these, ethylene and propylene oxide are preferred for forming the polycarbonates.

Generally, the polycarbonates of this invention are terminated with hydroxyl functionality or at least contain a plurality of free hydroxyl groups. Alternatively, these hydroxyl groups can be reacted with hydroxyl reactive organic compounds, as for example, methyl chloride, as described in our copending U.S. patent application having Ser. No. 757,909 and a filing date of Jan. 10, 1977, issued on Jan. 3, 1978 as U.S. Pat. No. 4,066,630. The subject matter therein is incorporated by reference. The capping of the free hydroxyl groups with the hydroxyl reactive organic compound enhances the thermal stability of the polycarbonates and thereby permits the utilization of the laminate in higher temperature environments.

The base layer suited for forming the laminate structure can be polymeric, metallic, or fibrous. In most instances, the base layer is a polymeric film which is either thermally formable and heat sealable or is dimensionally stable. Examples of thermally formable base layers include such polymers as ionomers, polyvinyl chloride, polyvinylidene chloride, and those with heat sealable characteristics, e.g. polyethylene, polypropylene, copolymers of polyethylene and polypropylene, and polystyrene. Other types of materials which can be used to formulate the base layer are dimensionally stable polymers, as for example, polyamides such as polycaprolactam or polyhexamethylene adipamide or a copolymer of an adipamide with hexamethylene sebacamide or with caprolactam; polyester, regenerated cellulose, aromatic polycarbonates and the like. Other materials which can be used for base layers include metallic foils such as aluminum foil and fibrous substrates such as paper substrates.

Optionally, a top layer can be used to sandwich the polyalkylene carbonate between it and the base layer for the purpose of providing additional features to the laminate structure. One technique is to use a base layer having heat sealable characteristics with a top coat having dimensionally stable characteristics for providing a laminate structure which can be used in the packaging of a variety of products under a multitude of environmental conditions. Examples of materials which can be used for top layers include polyethylene, polypropylene, esters of acrylic and methacrylic acid, polyamides, polyesters, polyvinyl chloride, polyvinylidine chloride, polyvinyl alcohol, polysulfone, resinous printing inks, phenylene oxide polymers, ink, and so forth. One of the advantages of applying a top coat to a laminate structure is where the laminate structure is printed and the printing requires protection. In this situation, the polyalkylene carbonate intermediate layer is printed with the ink and then coated with a protective top layer.

A number of techniques can be used to manufacture the laminate structures of this invention. One of the easier methods is to dissolve the polyalkylene carbonate in a solvent, cast the dispersion of solvent and polymer over the base layer and evaporate the solvent. A continuous film of polyalkylene carbonate is deposited and bonded to the base layer. A second method for the manufacture of the laminate structures is to use a heat and pressure technique wherein the polyalkylene carbonate, e.g. polyethylene carbonate, is melted and pressed against the base layer. A third technique, which is being widely used in the manufacture of laminate structure, is melt extrusion wherein both the base layer and adhesive barrier layer are coextruded or melt extruded and bonded together at the time of extrusion.

In the manufacture of the laminate structure, the base layer, barrier layer and top layer, if employed, have a thickness of from about 0.1 to about 5 mils. In preferred situations, the thickness of the individual film layers is from about 0.5 to about 2 mils. Thicknesses of less than 0.1 mil do not provide sufficient strength or sufficient moisture and oxygen barrier properties.

The following examples are provided to illustrate preferred embodiments of the invention and are not intended to restrict the scope thereof. Transmission data is measured in the following units unless otherwise identified: $cm^3/mil/24$ hr. $atm/100$ $in^2$ at 75° F. and is abbreviated as $cm^3/mil$.

EXAMPLE 1

A 5 gram sample of poly (ethylene carbonate) formed by the procedure of Example 1 in U.S. Pat. No. 3,900,424 having alternating units of ethylene oxide and carbon dioxide, a molecular weight of about 100,000, and a melting point of 190–200° C. was placed between two 6 inch squares of polyethylene film, the polyethylene film being 5 mils in thickness. The poly (ethylene carbonate) then was sandwiched between the polyethylene film by pressing at 5,000 psia in a Carver laboratory hydraulic press at a temperature of 140–150° C. A laminate was formed and the oxygen transmission data was 0.1–0.15 $cm^3/mil$. The double layer control film of polyethylene had an oxygen transmission of 102–123 $cm^3/mil$.

The laminate has an advantage over many other laminates in that it is readily heat sealed utilizing conventional techniques.

EXAMPLE 2

A laminate was prepared by first placing a 5 gram sample of poly (ethylene carbonate) as described in Example 1 between a 6 inch square of a 5 mil thick polyethylene base film and a top film of a 6 inch square of uncoated wrapping paper (thickness of about 3.5 mil). This material was heated to 80° C. and pressed under 15,000 lbs. pressure. The oxygen transmission data for the resulting laminate was 0.01–0.02 $cm^3/mil$ and the control, which was a laminate of polyethylene and paper excluding the polyethylene carbonate, was about 336–405 $cm^3/mil$.

EXAMPLE 3

A base film comprising a 6 inch square of 5 mil polyethylene film was coated with a five gram sample of poly (ethylene carbonate) similar to that of Example 1. The resulting coated polyethylene was pressed at a temperature of 140–150° C. under 5,000 lbs. Oxygen transmission data for the film was 0.7–0.8 cm$^3$/mil whereas the polyethylene film itself had a transmission rate of 336–405 cm$^3$/mil. This laminate is suited for packaging oil base products with the polyethylene carbonate layer being in contact with the oil.

EXAMPLE 4

Poly(propylene carbonate) having a molecular weight of about 100,000, melting point of 180–190° C. and alternating units of propylene oxide and carbon dioxide was prepared in a manner similar to that of Example 1, except propylene oxide was used in place of ethylene oxide. The poly(propylene carbonate) was dissolved in chloroform to form a 45% poly(propylene carbonate) solution. This solution then was cast over a 6 inch square of polyethylene. The solvent was evaporated to leave a film over the polyethylene base film. The resulting laminate had a vapor transmission rate of 20–22 cm$^3$/mil. The single layer of polyethylene film had a transmission rate of 336–405 cm$^3$/mil.

EXAMPLE 5

A polyethylene-poly(propylene carbonate) laminate was formed by first placing a 5 gram sample of the poly(propylene carbonate) between two 6 inch squares of polyethylene film having a thickness of 5 mils. These films then were heated to a temperature of 140–150° C. and subjected to a pressure of 5,000 lbs. Like the oxygen transmission data for the laminate of Example 4, the resulting polyethylene-(polypropylene carbonate) laminate was about 1–3 cm$^3$/mil and for a similar double layer polyethylene the transmission rate was about 102–123 cm$^3$/mil.

EXAMPLE 6

A polystyrene-polyethylene carbonate laminate was formed by the procedure of Example 1 except the 5 gram sample of poly(ethylene carbonate) was deposited on a film of polystyrene in place of the polyethylene. The oxygen barrier data was 0.2–0.5 cm$^3$/mil for the laminate whereas the polystyrene film itself had a transmission rate of 125–128.2 cm$^3$/mil.

EXAMPLE 7

The procedure of the Example 6 was followed except that polyvinyl chloride film was substituted for the polystyrene. The resulting oxygen transmission data resulted in a value 0.2–0.3 cm$^3$/mil for the laminate whereas the polyvinyl chloride film had a transmission rate of 93.5–94.1 cm$^3$/mil.

EXAMPLE 8

A 6 inch square piece of 4 mil polyethylene was coated with a thin layer of poly(ethylene carbonate) by dissolving 5 grams of the poly(ethylene carbonate) in chloroform and casting the resulting solution over the polyethylene film. Subsequently, the solvent was dried leaving a film of about 1.0 mil in thickness. The resulting laminate had an oxygen transmission rate of 4.8–7.2 cm$^3$/mil.

By comparison, a commercially available 0.3 mil saran coated polyethylene laminate exhibited an oxygen transmission rate of 3.4–5.2 cm$^3$/mil. These tests show the present laminate has similar transmission characteristics as the commercially available laminate and yet it is heat sealable.

What is claimed is:

1. In a laminate structure comprising a base layer and a polycarbonate layer bonded to the base layer, the improvement wherein the polycarbonate layer is an adhesive barrier layer and the polyalkylene carbonate is represented by the formula:

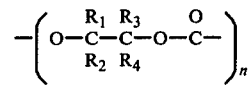

$R_1$ is hydrogen, a halomethyl group or hydrocarbyl group having from 1 to 6 carbon atoms;
$R_3$ is hydrogen, a halomethyl group, or a hydrocarbyl group having from 1 to 6 carbon atoms;
$R_2$ and $R_4$ are hydrogen, or hydrocarbyl groups having from 1 to 6 carbon atoms; or
$R_1$, $R_2$, $R_3$ and $R_4$ are combined together constituting a carbocyclic ring having from 4 to 7 carbon atoms; and
n is a number from about 250 to about 6,500.

2. The laminate structure of claim 1 wherein the base layer is thermally formable and heat sealable.

3. The laminate structure of claim 2 wherein the base layer is a polyolefin.

4. The laminate structure of claim 3 wherein the polyolefin base layer is selected from the group consisting of polyethylene and polypropylene or copolymers thereof.

5. The laminate structure of claim 1 wherein said base layer is dimensionally stable.

6. The laminate structure of claim 5 wherein said base layer is selected from the group consisting of regenerated cellulose, polyamide, aluminum foil, paper, and polyester.

7. The laminate structure of claim 4 wherein $R_2$ and $R_4$ of said polycarbonate are hydrogen.

8. The laminate structure of claim 7 wherein $R_1$ is selected from hydrogen and methyl, and $R_3$ is hydrogen.

9. The laminate structure of claim 8 wherein the molecular weight of the barrier layer is from about 50,000 to 150,000.

10. A laminate structure having excellent oxygen and moisture vapor barrier properties comprising:
a base layer selected from the group consisting of polyvinyl chloride, polyethylene, polypropylene, regenerated cellulose, paper, polyamide, polyester, aluminum foil, polystyrene and ionomer; and
an adhesive barrier layer of a polyalkylene carbonate bonded to said base layer, said polycarbonate formed by reacting carbon dioxide and an epoxide selected from the group consisting of ethylene oxide and propylene oxide, said polycarbonate having a molecular weight of from 50,000 to about 150,000.

11. The laminate structure of claim 10 which includes a dimensionally stable top layer applied to the surface of said polyalkylene carbonate.

12. The laminate structure of claim 11 wherein said base layer is selected from the group consisting of polyethylene and polypropylene, and said top coat is selected from the group consisting of regenerated cellulose, polyamide, polyester, and paper.

* * * * *